No. 875,293. PATENTED DEC. 31, 1907.
J. G. SCOTT.
SHACKLE FOR TRANSMISSION ROPE.
APPLICATION FILED MAY 4, 1907.

Witnesses

Inventor
John G. Scott
By
Attorney

UNITED STATES PATENT OFFICE.

JOHN G. SCOTT, OF GIRARDVILLE, PENNSYLVANIA.

SHACKLE FOR TRANSMISSION-ROPE.

No. 875,293.      Specification of Letters Patent.      Patented Dec. 31, 1907.

Application filed May 4, 1907. Serial No. 371,878.

*To all whom it may concern:*

Be it known that I, JOHN G. SCOTT, a citizen of the United States, residing at Girardville, in the county of Schuylkill and State of Pennsylvania, have invented certain new and useful Improvements in Shackles for Transmission-Ropes, of which the following is a specification.

This invention relates to means for connecting the ends of rope used as a belt for the transmission of power, particularly in and relating to coal mines. Usually these rope belts are made in two sections, one long and the other short, so that the short section can be replaced by another one a little shorter or a little longer to allow for stretching and shrinkage of the belt, according to atmospheric conditions.

The shackles which are employed to connect the ends of the rope have been frequently liable to be pulled off during the day, thus causing a suspension of work until a new shackle is applied or the old one replaced and the belt re-connected and the machinery again started. During this time many of the hands are idle and as the machinery is also idle, much time is lost.

The object of my invention is to apply a shackle which shall be strong and simple in construction and which may be quickly applied to the rope without requiring rivets, and which will provide for a pull or tension in line with the center of the rope. To this end the invention consists in the device and the construction thereof, substantially as hereinafter described and claimed.

Figure 1:
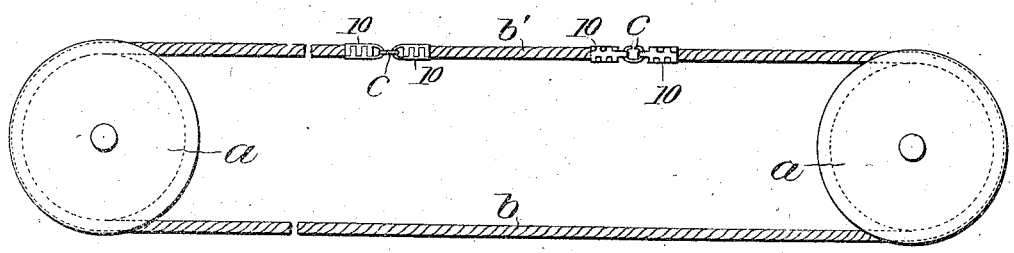
Figure 2:
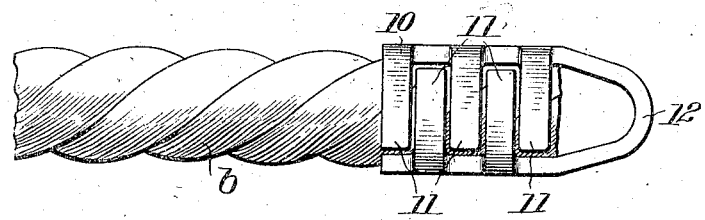
Figure 3:
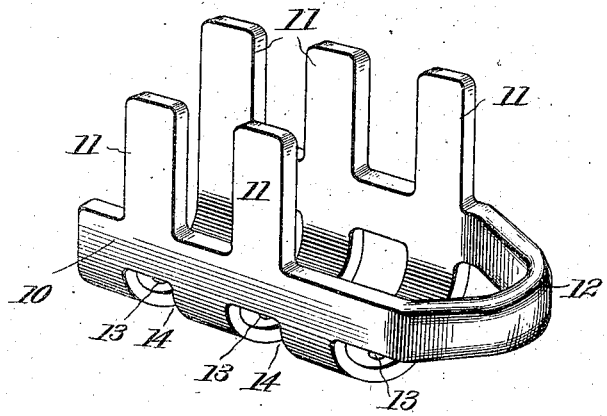

Of the accompanying drawings, Figure 1 is a side elevation of a rope transmission belt having the sections connected by my improved shackles. Fig. 2 represents a side elevation of one of my improved shackles attached to the end of a rope. Fig. 3 is a perspective view of the shackle before its prongs or fingers have been bent down upon the rope.

Similar reference characters indicate the same or similar parts in all of the views.

The body 10 of the shackle is curved to closely fit one side of the rope. I prefer, however, that the said body shall have transverse openings. Extending from each edge of the body and integral therewith, are prongs or fingers 11, the said prongs or fingers alternating with each other lengthwise of the shackle, so that when they are hammered down against the side of the rope opposite the body 10, they will extend past each other so as to practically clamp and bind all portions of the rope. In the form illustrated, the body is formed with transverse openings as at 14, so that the prongs or fingers which are in transverse alinement with such openings will tend, when hammered down firmly, to cause the surface of the rope to bulge somewhat through the openings 14.

One end of the body is formed with a loop 12 integral with the body, and extending in a direction substantially diametrically across one end of the shackle so that when the rope belt is coupled up, the pull or tension will be in line with the center of the rope, the pull on the rope being distributed equally around the entire surface of the latter.

For many purposes the structure of the body and of the prongs or fingers as described, will provide an ample gripping hold on the rope. But sometimes it is desirable to provide additional holding means. To this end, the body is provided with holes 13 through which wrought nails or wood screws may be driven into the rope to aid in holding it firmly.

Referring to Fig. 1, pulleys *a* are indicated for the rope belt, the latter comprising a long section *b* and a short section *b'*. Each end of each rope section is provided with my improved shackle. To connect the shackles, ordinary hook links *c* are employed. The transmission belt is frequently used, partly or wholly out of doors, and consequently frequently gets wet by rain, resulting in shrinkage. When this occurs, the section *b'* is replaced by a similar section which is a little longer. And when the belt dries and stretches, a somewhat shorter section *b'* is put in place. As this requires the use of two pairs of shackles, a structure which reduces the liability of pulling loose from the rope is a material advantage, since there are four of the devices. Moreover, it is essential, of course, that the coupling shall pass freely around the pulleys, and they must, therefore, to be practical, be as short as possible. Long ones would not travel freely around the pulleys. By my structure of the alternating prongs or fingers passing each other and gripping the rope, I am enabled to use quite short bodies and yet enable a firm grip to be had on the rope. The shorter the body, the more readily will the shackle pass properly around the pulleys. And as the ends of the loop are integral with the body at substantially diametrically opposite points of the latter, the pull imparted by the hook links c is equally distributed around the end of the rope.

Having now described my invention, I claim:—

1. A shackle for rope belts comprising a body curved to fit the rope and having fingers projecting from its edges to grasp and bind the rope on the side opposite the curved body, said fingers alternating to pass each other in clamping the rope, and a loop diametrically across one end of the body and having both ends integral with the body.

2. A shackle for rope belts comprising a body curved to fit the rope and having transverse openings and having fingers projecting from its edges to grasp and bind the rope on the side opposite the curved body, said fingers alternating to pass each other in clamping the rope, the transverse openings in the body being in line with one side set of fingers, and a loop diametrically across one end of the body and having both ends integral with the body.

In testimony whereof I affix my signature in presence of two witnesses.

JOHN G. SCOTT.

Witnesses:
 ARTHUR J. BROWN,
 JOHN G. SCOTT, Jr.